United States Patent [19]
Voss et al.

[11] Patent Number: 5,830,061
[45] Date of Patent: Nov. 3, 1998

[54] COMBINE HARVESTER

[75] Inventors: Lothar Voss, Neustadt; Wolfgang Hentsch, Bautzen; Klaus Eckert, Neusalza-Spremberg; Christian Noack, Guttau; Wolf-Carsten Löbel, Malschwitz; Volker Windisch, Obergurig, all of Germany

[73] Assignee: MDW Mahdrescherwerke GmbH, Singwitz, Germany

[21] Appl. No.: 673,232

[22] Filed: Jun. 27, 1996

[30] Foreign Application Priority Data

Jun. 28, 1995 [DE] Germany .......................... 195 23 429.4
Feb. 24, 1996 [DE] Germany .......................... 196 06 989.0

[51] Int. Cl.[6] .................................................. A01F 07/04
[52] U.S. Cl. ........................... 460/70; 460/75; 460/101; 460/114; 56/14.6
[58] Field of Search ................... 460/70, 69, 75, 460/76, 83, 101, 114; 56/14.5, 14.6

[56] References Cited

U.S. PATENT DOCUMENTS

| | | | |
|---|---|---|---|
| 4,497,162 | 2/1985 | Eguchi et al. ............................ | 56/14.6 |
| 4,739,774 | 4/1988 | Heidjann ............................... | 56/14.6 X |
| 4,968,284 | 11/1990 | Klimmer et al. .................... | 460/114 X |
| 5,466,190 | 11/1995 | Skinner et al. ......................... | 460/101 |
| 5,519,987 | 5/1996 | Voss ........................................ | 56/14.6 |

FOREIGN PATENT DOCUMENTS 40 23 894  2/1991  Germany .

*Primary Examiner*—Terry Lee Melius
*Attorney, Agent, or Firm*—Herbert Dubno; Andrew Wilford

[57] ABSTRACT

An automotive combine has a frame adapted to move in a travel direction along the ground, a front housing pivotal on the frame, a cutter on the front housing for cutting standing crop, and a main thresher on the front housing having a front intake and a rear output for taking in the cut standing crop at the intake, threshing it, and ejecting it at the output as a chaff/grain stream and a separate chaff stream. A pair of separate conveyors on the frame each have an intake at the rear output for receiving the chaff/grain stream and a respective output for ejecting respective portions of the chaff/grain stream. One of the conveyor outputs is vertically spaced above the other conveyor output. An upper sieve at the one conveyor output and a separate lower sieve at the other conveyor output receive the respective portions of the chaff/grain stream and separate kernels from chaff therein. The kernels are moved from the sieves to a grain bin on the frame while the chaff is blown out onto the ground outside the combine.

16 Claims, 8 Drawing Sheets

COMBINE HARVESTER

FIELD OF THE INVENTION

The present invention relates to combine harvester. More particularly this invention concerns an automotive machine that cuts a standing grain crop and that threshes the cut crop.

BACKGROUND OF THE INVENTION

A standard automotive combine harvester has a frame on whose front end is provided a standing crop cutter and which also carries a threshing system for the cut standing crop. Such a machine normally cuts the standing crop, for instance wheat, threshes the kernels off the stalks, deposits the kernels in a grain bin on the machine, and spreads the stalks as chopped chaff on the field behind the machine.

In German patent 4,023,894 filed 28 Feb. 1991 by Voss et al an axial throughput threshing device is mounted parallel to the machine's longitudinal axis. This threshing device delivers a kernel-rich stream to a following separating system that gets substantially all the chaff off the kernels and deposits the kernels in the grain bin. The threshing and separating drums are mounted between the cutter and the final kernel-cleaning system on a housing that can move in a vertical plane relative to the combine frame between the front wheels. Underneath the threshing drums are several auger conveyors that extend back to the cleaning device.

In commonly owned U.S. Pat. No. 5,519,987 a combine is disclosed having a frame adapted to move in a travel direction along the ground, a front housing pivotal on the frame, and a cutter releasably mounted on the front housing for cutting standing crop. A main thresher on the pivotal front housing has a front intake and a rear output for taking in the cut standing crop at the intake, threshing it, and outputting it at the output as a kernel-rich stream and a separate chaff stream. A blower conveyor on the frame has an intake receiving the kernel-rich stream and an output provided with a conduit for blowing the kernel-rich stream from the output. A grain bin is mounted on the machine frame and a sieve on the frame underneath the output of the blower separates kernels from chaff in the kernel-rich stream and delivers the kernels to the grain bin while depositing the chaff on the ground outside the combine.

The capacity of such combines is limited by the amount of material the threshing subsystem can handle. The capacity of this subsystem is inherently limited since only a certain area is available in the machine for screening and separating the chaff from the grain so the machine must move at low speed to avoid overloading the threshing device.

OBJECTS OF THE INVENTION

It is therefore an object of the present invention to provide an improved combine harvester.

Another object is the provision of such an improved combine harvester which overcomes the above-given disadvantages, that is which has a high threshing capacity so that it can travel at relatively high speed.

SUMMARY OF THE INVENTION

An automotive combine has according to the invention a frame adapted to move in a travel direction along the ground, a front housing pivotal on the frame, a cutter on the front housing for cutting standing crop, and a main thresher on the front housing having a front intake and a rear output for taking in the cut standing crop at the intake, threshing it, and ejecting it at the output as a chaff/grain stream and a separate chaff stream. A pair of separate conveyors on the frame each have an intake at the rear output for receiving the chaff/grain stream and a respective output for ejecting respective portions of the chaff/grain stream. One of the conveyor outputs is vertically spaced above the other conveyor output. An upper sieve at the one conveyor output and a separate lower sieve at the other conveyor output receive the respective portions of the chaff/grain stream and separate kernels from chaff therein. The kernels are moved from the sieves to a grain bin on the frame while the chaff is blown out onto the ground outside the combine. Each portion is generally half of the chaff/grain stream.

Thus each sieve need only separate half of the incoming mixture. Since it is possible to stack two complete separating units or sieves in the combine, this doubles the sieve area and, of course, the treatment capacity. Since it is typically the sieve that represents the bottleneck in the combine, doubling the sieve capacity doubles the overall capacity of the unit.

The main thresher includes a pair of threshing drums spaced apart transverse to the direction and a transfer conveyor between the cutter and the drums for splitting output from the cutter into two streams and feeding same to the respective drums. In addition according to this invention an intermediate thresher is provided on the frame receiving the chaff stream from the main thresher for separating kernels from the chaff stream and feeding the separated kernels to the conveyor intakes while ejecting the chaff of the chaff stream from the combine onto the ground. The intermediate thresher has ends provided with choppers for comminuting the chaff prior to ejecting it onto the ground. In addition a transverse conveyor underneath the main and intermediate threash receives the kernel-rich stream therefrom and feeds same to the conveyor intakes.

Each conveyor in accordance with this invention includes a tube having ends defining the respective intake and output and an auger in the tube rotatable to move material therein from the respective intake to the respective output. Each auger can be continuous from the respective intake to the respective output. Alternately each tube extends continuously from the main thresher to the respective sieve. It is possible for the tube of the conveyor of the lower sieve to be substantially straight and the tube and auger of the conveyor of the upper sieve each to have two straight sections extending at an angle of less than 180° to each other.

According to the invention material outputted from the upper sieve is fed to the lower sieve. Similarly material outputted from the lower sieve is fed to the upper sieve. Thus the mixtures being sieved are separated into chaff which is blown out the back of the combine, kernels which move forward on the forwardly tipped sieve plates, and some kernel/chaff mixture that drops down off the rear ends of the sieve plates. This latter mixture is recycled until it is completely separated.

To ensure that the bin is filled evenly the combine further has according to the invention respective elevators for feeding kernels from the sieves to respective front and rear portions of the bin.

BRIEF DESCRIPTION OF THE DRAWING

The above and other objects, features, and advantages will become more readily apparent from the following description, it being understood that any feature described with reference to one embodiment of the invention can be used where possible with either of the other embodiments and that reference numerals or letters not specifically mentioned with reference to one figure but identical to those of another refer to structure that is functionally if not structurally identical. In the accompanying drawing.

SPECIFIC DESCRIPTION

Figure 1:
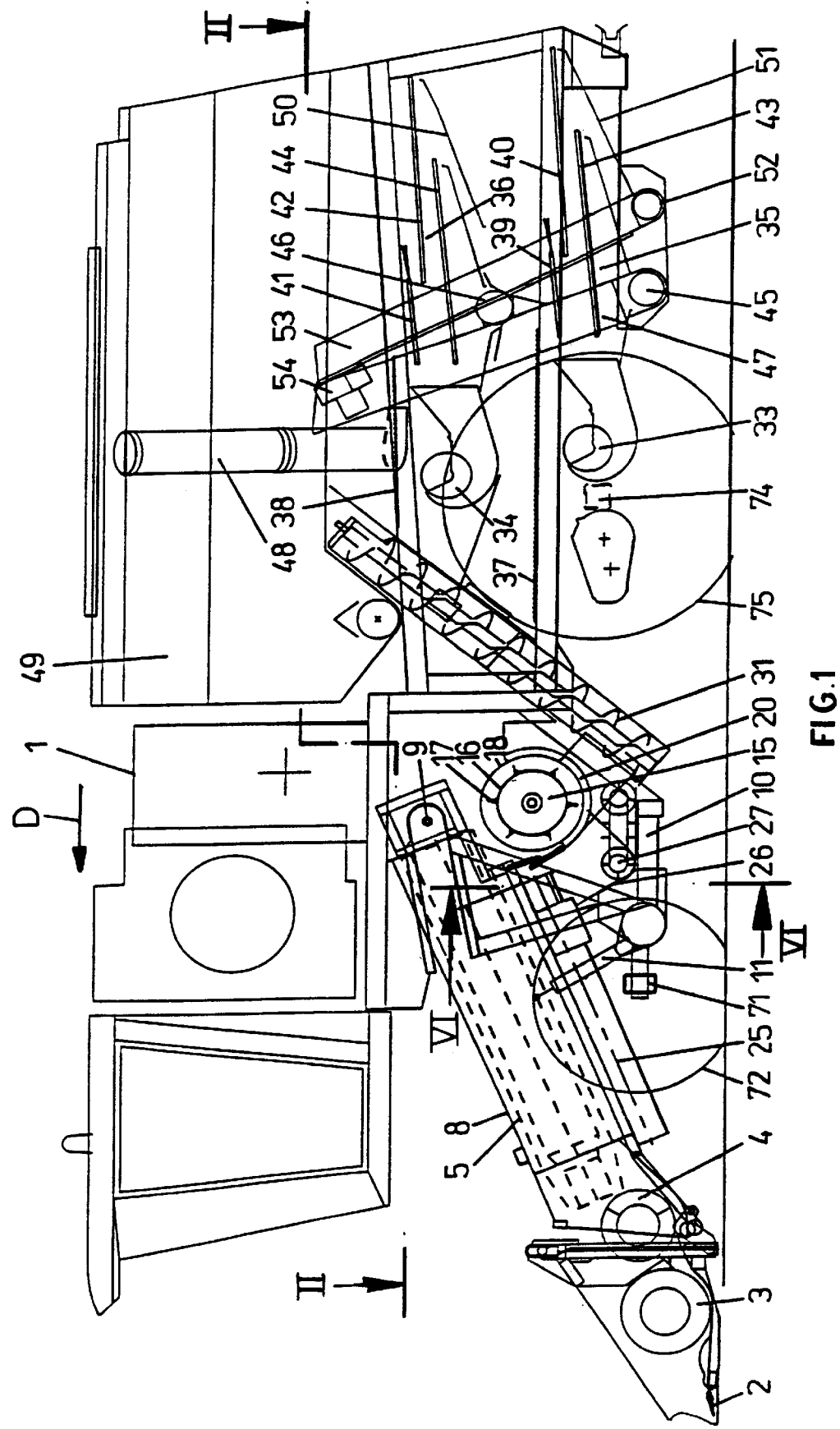
FIG. 1 is a small-scale diagrammatic side view partly in vertical section through a combine according to the invention.
Figure 2:
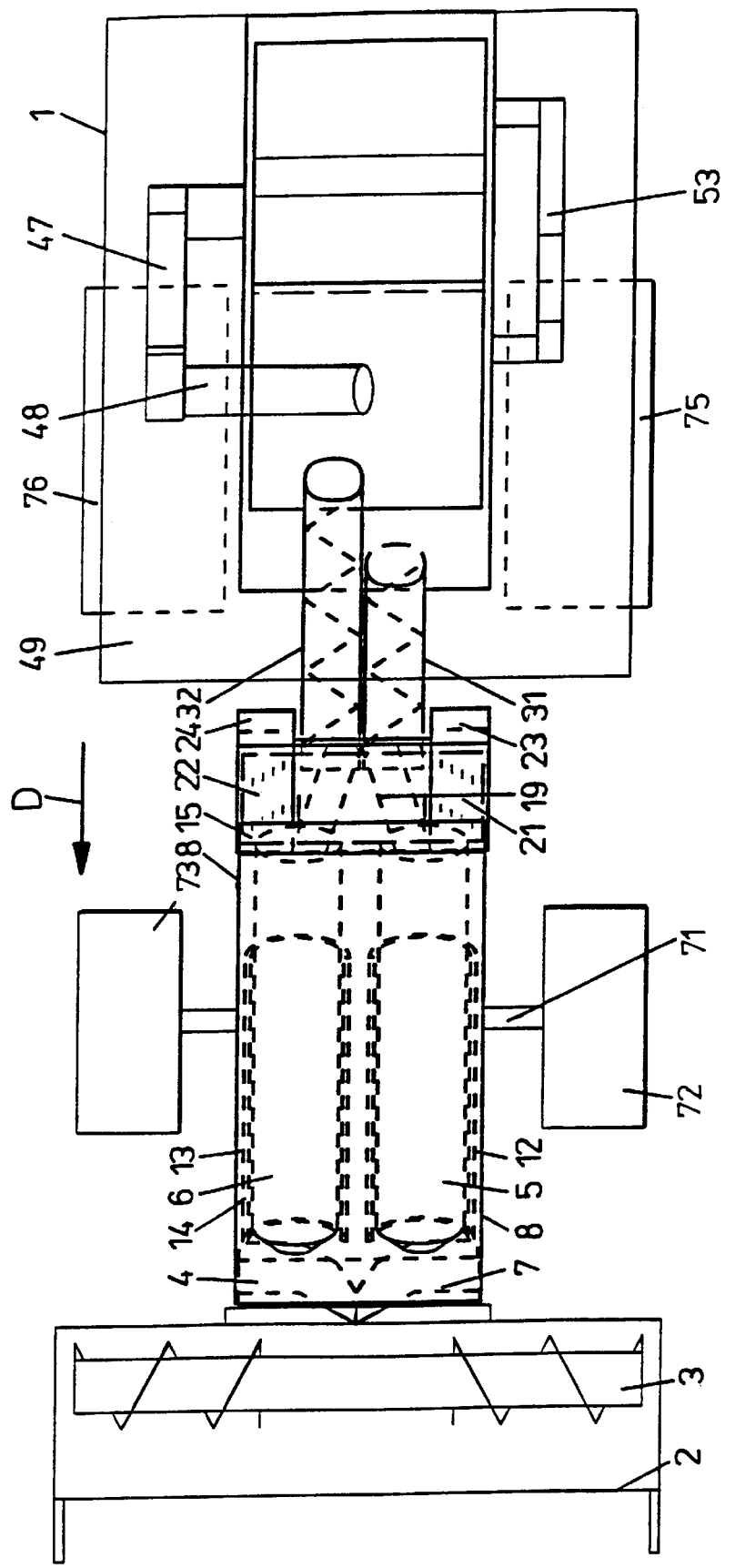
FIG. 2 is a horizontal section taken along line II—II of FIG. 1.
Figure 6:
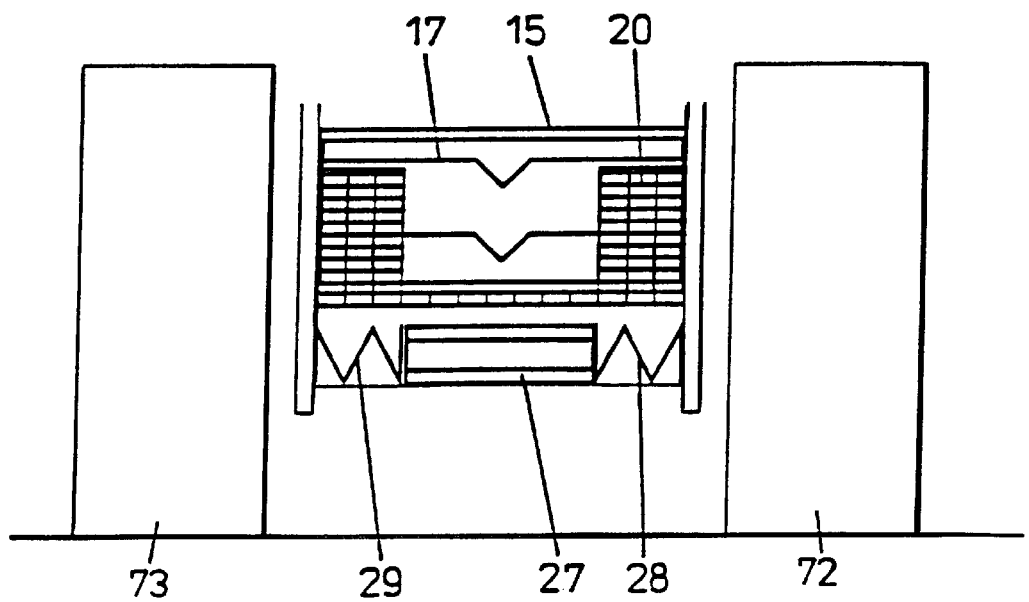
FIG. 6 is a vertical section taken along line VI—VI of FIG. 1.

As seen in FIGS. 1, 2, and 6, a combine 1 according to the invention has a front-mounted cutter 2 that severs standing crop at the base and feeds it to a transverse conveyor 3 that move the cut crop transversely of a horizontal travel direction D to a central location and then to a conveyor 4 that has vanes 7 that split the incoming cut-crop stream up into two substreams that it feeds to a thresher comprised of two longitudinally extending threshing- and separating drums 5 and 6. A common housing 8 pivotal about a transverse axis 9 on a frame 10 of the combine holds the drums 5 and 6 and the unillustrated rotary drive shaft for these drums 5 and 6 is centered on this axis 9 so the housing 8 can pivot about the axis 9 without affecting force transmission to the drums 5 and 6. The cutter 2 can be removed from the housing 8 and its vertical position can be set by hydraulic cylinders 11 braced between the frame 10 and the housing 8.

The cut crop is threshed as it moves back in the direction D between the drums 5 and 6 and respective threshing baskets 12 and 13 surrounding them and defining with them annular spaces 14. A mixture of grain kernels, chaff, and straw drops down into auger conveyors 25 extending underneath the drums 5 and 6 and feeding the mixture back to drop onto a deflector or guide plate 26.

The mainly chaff mixture exiting from the trailing ends of the two spaces 14 defined between the drums 5 and 6 and their respective baskets 12 and 13 is fed to a separator 15. The transverse separator 15 has a driven drum 16 with peripheral ridges 17 whose upper region is covered by a semicylindrical shield 18 whose inner wall in turn is formed with helical conveyor ribs 19. The lower region of the drum 16 is surrounded by a separating basket or mesh 20. Thus the mainly chaff mixture fed tangentially in to the gap between the rotating drum 16 and the basket 20 is forced outward by the ribs 19 so that after several revolutions it is moved outward to choppers 21 and 22 that eject it via respective outputs 23 and 24 to form a pair of windrows on the ground underneath the machine. The choppers 21 and 22 can have their own drive so that they can be shut down if desired so that unchopped straw is deposited on the ground. Either way the straw or chaff exits the machine early and any remaining kernels drop down as described below.

Meanwhile the mixture of grain and chaff landing on the plate 26 is caught by a conveyor 27 having augers 28 and 29 (FIG. 6) that move the mixture in toward the center of the conveyor 27 which also receives the grain from the separator 15 and feeds it to two separate auger conveyors 31 and 32. The conveyor 31 is short and the conveyor 32 is long, and they are positioned next to each other transverse to the direction D. Instead of auger conveyors 31 and 32 blowers, scraper conveyors, or other types of conveyors could of course be used.

The long conveyor 32 drops its portion of the chaff/grain mixture in upper sieve 36 atop a vibrating separator plate 38 arranged downstream of an upper blower 34 and above respective sieve plates 41, 42, and 44 while the short conveyor 31 drops its portion of the chaff/grain mixture in a lower sieve 35 atop a vibrating separator plate 37 arranged downstream of a lower blower 33 and above respective sieve plates 39, 40, and 43. Most of the chaff is blown out the back of the combine 1 while the grain works its way down. Respective auger-type grain conveyors 45 and 46 feed the grain laterally to a common grain elevator 47 that leads to another common conveyor 48 that feeds the grain to a grain bin 49 atop the machine 1.

A deflector 50 dumps the output of the upper separating unit or sieve 36 formed by the blower 34, plate 41, and screens 42 and 44 onto the upper plate 39 of the lower separating unit or sieve 35 formed by the lower blower 33, upper plate 39, and sieve plates 40 and 43. Thus this material is processed twice, if necessary. Similarly another transverse conveyor 52 and elevator 53 moves any remaining portion of the chaff/grain mixture from the lower end of a catch plate 51 beneath the lowermost plate 43 to a blower 54 which shoots it over the top plate 41 for reprocessing.

The machine itself has a pivoting front axle 71 carrying front wheels 72 and 73 and a fixed rear axle 74 carrying rear wheels 75 and 76. The wheels 72, 73, 75, and 76 are all driven when off road, that is in the field, but for highway travel of the machine the drive to the front wheels 72 and 73 is uncoupled and only the rear wheels 74 and 75 are driven.

Figure 3:
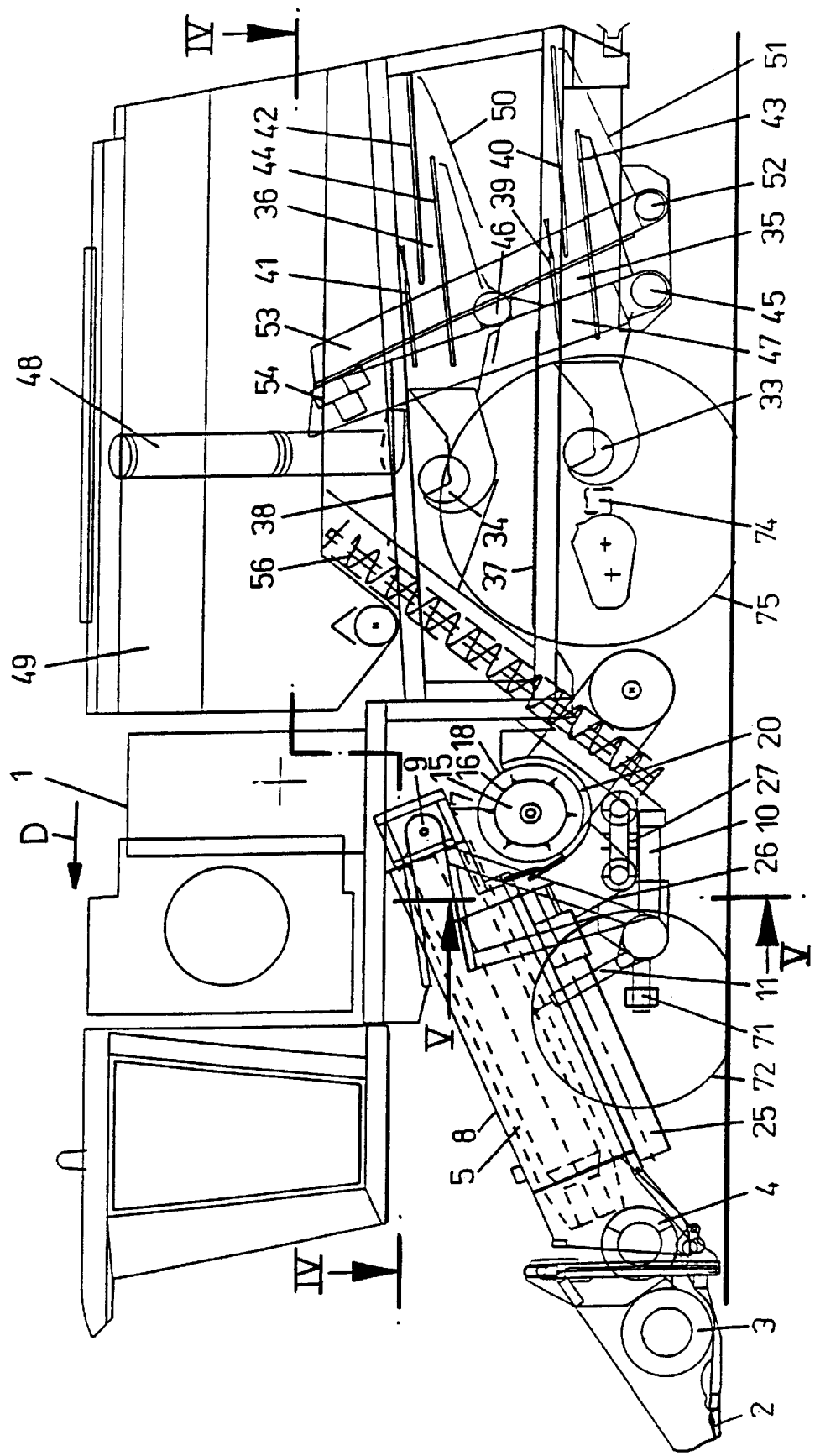
FIG. 3 is a view like FIG. 1 of another combine according to the invention.
Figure 4:
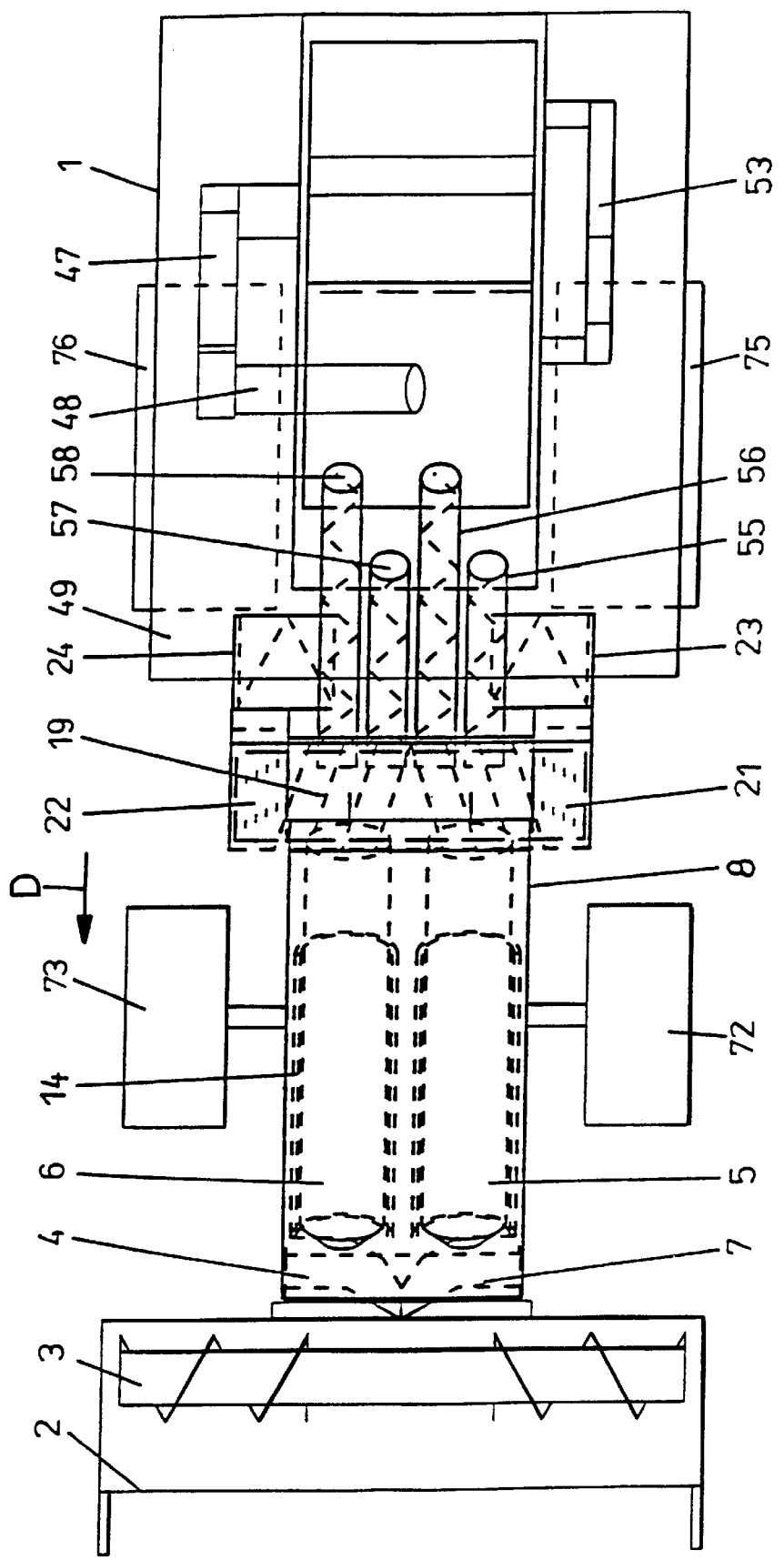
FIG. 4 is a horizontal section taken along line IV—IV of FIG. 3.
Figure 5:
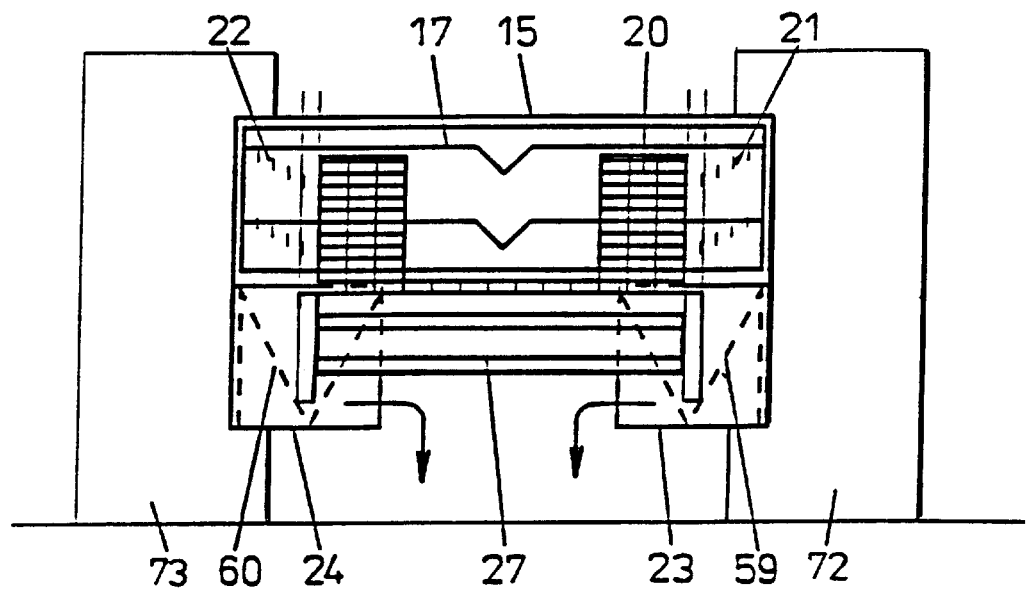
FIG. 5 is a vertical section taken along line V—V of FIG. 3.

In the arrangement of FIGS. 3, 4, and 5 the lower and upper separating units 35 and 36 receive the chaff/grain mixture from four separate auger conveyors 55, 56, 57, and 58 that are transversely spaced, with the conveyors 55 and 57 substantially shorter but more erect than the conveyors 56 and 58. The short conveyors alternate with the long ones for an even distribution of the crop over the lower and upper separators 35 and 36. To this end the scraper conveyor 27 extends over the entire width of all four conveyors 55, 56, 57, and 58. The separator 15 extends over the entire width of the frame 10 while the lateral outputs 23 and 24 feed the chaff to parallel conveyors 59 and 60 which feed the chaff back inward to form a common windrow under the center of the combine 1. Such conveyors 59 and 60 could also be provided on the system of FIGS. 1, 2, and 6.

Figure 7:
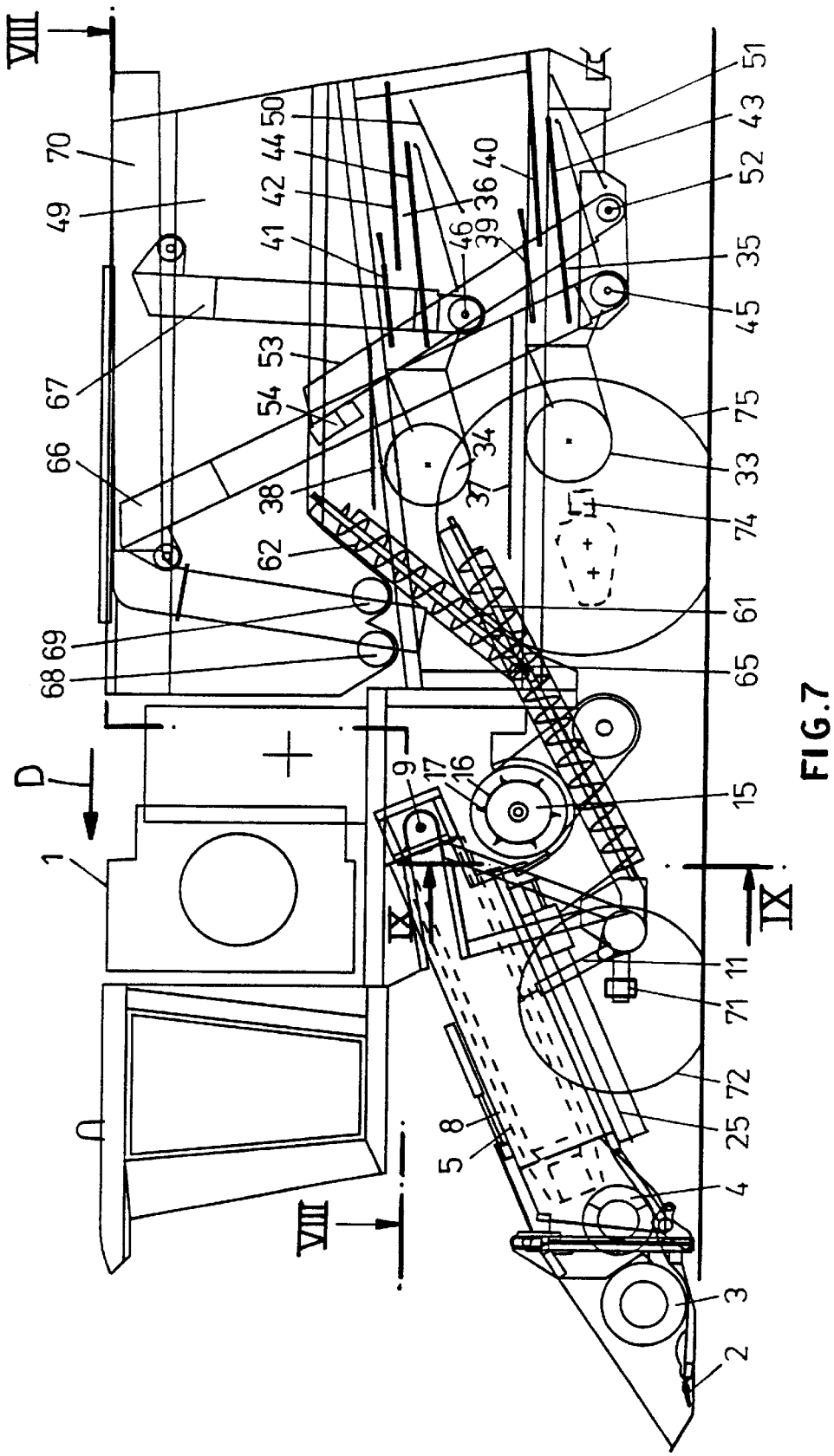
FIG. 7 is a view like FIG. 1 of yet another combine according to the invention.
Figure 8:
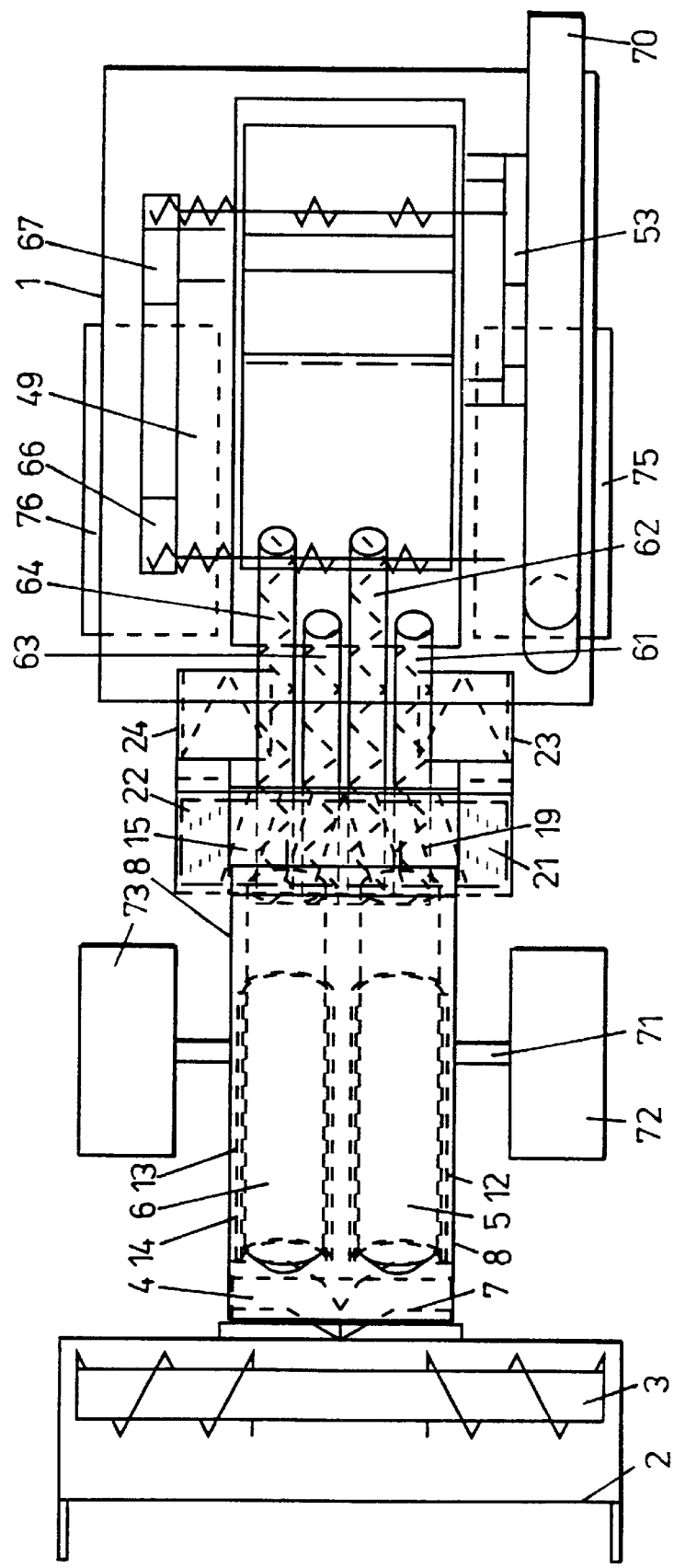
FIG. 8 is a horizontal section taken along line VIII—VIII of FIG. 7.
Figure 9:
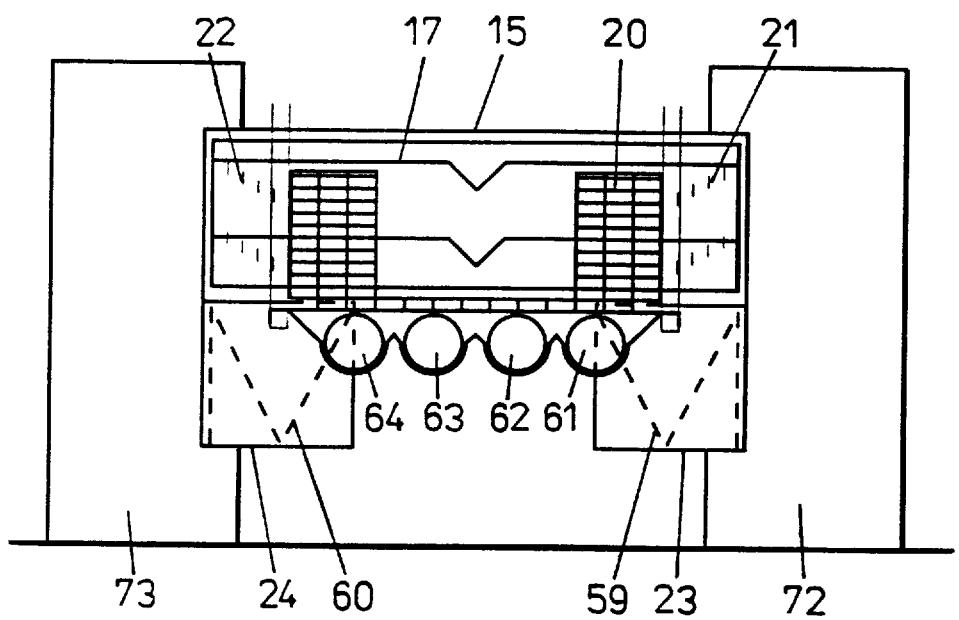
FIG. 9 is a vertical section taken along line IX—IX of FIG. 7.

FIGS. 7, 8, and 9 show another arrangement where the output of the separator 15 as well as of the conveyors 25 is dumped directly into the intake ends of four conveyors 61, 62, 63, and 64 of which the conveyors 62 and 64 each have two straight sections joined at elbow joints 65 so they can reach the upper separator unit 36. In addition separate grain elevators 66 and 67 are provided for the lower and upper units 35 and 36 to transport the grain recovered thereby up to the front and rear ends of the grain hoper 49. Another pair of auger conveyors 68 and 69 in the bin 49 can convey the grain via a chute 70 to an adjacent truck.

We claim:

1. An automotive combine comprising:
   a frame adapted to move in a travel direction along the ground;
   a front housing pivotal on the frame;
   means including a cutter on the front housing for cutting standing crop;
   main threshing means on the front housing having a front intake and a rear output for taking in the cut standing crop at the intake, threshing it, and ejecting it at the rear output as a chaff/grain stream and a separate chaff stream;
   means including a pair of separate conveyors on the frame each having an intake at the rear output for receiving the chaff/grain stream and a respective output for ejecting respective portions of the chaff/grain stream, one of the conveyor outputs being vertically spaced above the other conveyor output;
   means including an upper sieve at the one conveyor output and a separate lower sieve at the other conveyor output for receiving the respective portions of the chaff/grain stream and separating kernels from chaff therein;
   a grain bin on the frame; and
   means for delivering the kernels from the upper and lower sieves to the grain bin while depositing the chaff on the ground outside the combine.

2. The combine defined in claim 1 wherein each portion is generally half of the chaff/grain stream.

3. The combine defined in claim 1 wherein the threshing means includes
   a pair of threshing drums spaced apart transverse to the direction, and
   a transfer conveyor between the cutter and the drums for splitting output from the cutter into two streams and feeding same to the respective drums.

4. The combine defined in claim 1, further comprising
   means including an intermediate thresher on the frame receiving the chaff stream from the main threshing means for separating kernels from the chaff stream and feeding the separated kernels to the conveyor intakes while ejecting the chaff of the chaff stream from the combine onto the ground.

5. The combine defined in claim 4 wherein the intermediate thresher has ends provided with means for chopping the chaff prior to ejecting it onto the ground.

6. The combine defined in claim 4, further comprising
   a transverse conveyor underneath the main threshing means for receiving the kernel-rich stream therefrom and underneath the intermediate thresher for receiving the kernels therefrom and feeding same to the conveyor intakes.

7. The combine defined in claim 1 wherein each conveyor includes
   a tube having ends defining the respective intake and output, and
   an auger in the tube rotatable to move material therein from the respective intake to the respective output.

8. The combine defined in claim 7 wherein each auger is continuous from the respective intake to the respective output.

9. The combine defined in claim 7 wherein each tube extends continuously from the main threshing means to the respective sieve.

10. The combine defined in claim 9 wherein the tube of the conveyor of the lower sieve is substantially straight and the tube and auger of the conveyor of the upper sieve each have two straight sections extending at an angle of less than 180° to each other.

11. The combine defined in claim 1, further comprising
    means for feeding outputted material from the upper sieve to the lower sieve.

12. The combine defined in claim 1, further comprising
    means for feeding outputted material from the lower sieve to the upper sieve.

13. The combine defined in claim 1 wherein the bin is above the sieves, the combine further comprising
    respective elevators for feeding kernels from the sieves to respective front and rear portions of the bin.

14. The combine defined in claim 1 wherein each sieve includes:
    at least one upper sieve plate inclined forwardly downward in the travel direction and
    means including a blower for directing a current of air in the direction back over the respective upper sieve plate for blowing the chaff back while the kernels run forward.

15. The combine defined in claim 14 wherein each sieve includes a plurality of such sieve plates spaced horizontally above one another.

16. The combine defined in claim 14 wherein each sieve includes at least one vibrating sieve plate.

* * * * *